(12) United States Patent
Anisimov et al.

(10) Patent No.: US 9,082,109 B2
(45) Date of Patent: *Jul. 14, 2015

(54) METHOD FOR ASSEMBLING A BUSINESS PROCESS AND FOR ORCHESTRATING THE PROCESS BASED ON PROCESS BENEFICIARY INFORMATION

(71) Applicant: Genesys Telecommunications Laboratories, Inc., Daly City, CA (US)

(72) Inventors: Nikolay A. Anisimov, Concord, CA (US); Vladimir Mezhibovsky, San Francisco, CA (US); Brian Galvin, Silverdale, WA (US)

(73) Assignee: GENESYS TELECOMMUNICATIONS LABORATORIES, INC., Daly City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/625,566

(22) Filed: Sep. 24, 2012

(65) Prior Publication Data

US 2013/0022179 A1 Jan. 24, 2013

Related U.S. Application Data

(63) Continuation of application No. 11/965,608, filed on Dec. 27, 2007, now Pat. No. 8,275,647.

(51) Int. Cl.
*G06F 9/44* (2006.01)
*G06Q 10/10* (2012.01)
*G06Q 10/06* (2012.01)

(52) U.S. Cl.
CPC .............. *G06Q 10/10* (2013.01); *G06Q 10/0633* (2013.01)

(58) Field of Classification Search
CPC ............ H04M 1/72583; H04M 3/428; G06Q 10/0633; G06Q 10/10
USPC .......... 379/88.01; 704/243; 705/7.18, 7.27, 5; 707/708; 713/182; 348/155; 370/241, 370/252; 340/438; 345/1.1; 700/59
See application file for complete search history.

(56) References Cited

U.S. PATENT DOCUMENTS

| | | | | |
|---|---|---|---|---|
| 5,019,799 | A * | 5/1991 | Oshiage et al. | 340/438 |
| 5,542,051 | A * | 7/1996 | Sugita et al. | 714/51 |
| 5,764,507 | A * | 6/1998 | Chuo | 700/18 |
| 6,732,080 | B1 * | 5/2004 | Blants | 705/7.18 |
| 6,992,644 | B1 * | 1/2006 | Itaba et al. | 345/1.1 |

(Continued)

OTHER PUBLICATIONS

Prior, Carol, *Workflow and Process Management*, Maestro BPE Pty Limited, Workflow Handbook 2003, Australia, 9 pages.

(Continued)

*Primary Examiner* — Gerald Gauthier
(74) *Attorney, Agent, or Firm* — Christie, Parker & Hale, LLP

(57) ABSTRACT

A system for assembling a business process or a portion thereof includes a rules base containing executable rules and defined business process elements, a workflow orchestration engine, and at least one interface available to a process beneficiary. Information known about and or provided by a process beneficiary interacting with the at least one interface is used to execute one or more of the rules causing assembly of a new business process or a portion thereof according to workflow orchestration rules the new or modified process directing servicing of the process beneficiary accordingly.

18 Claims, 7 Drawing Sheets

(56) References Cited

U.S. PATENT DOCUMENTS

| | | | |
|---|---|---|---|
| 7,164,955 B2 * | 1/2007 | Moreas et al. | 700/59 |
| 7,350,185 B2 | 3/2008 | Sparago et al. | |
| 7,404,188 B2 | 7/2008 | Luty et al. | |
| 7,440,894 B2 * | 10/2008 | Zhou et al. | 704/243 |
| 7,549,054 B2 * | 6/2009 | Brodie et al. | 713/182 |
| 7,672,247 B2 * | 3/2010 | Gonzalez et al. | 370/252 |
| 7,716,522 B2 * | 5/2010 | Hanai et al. | 714/13 |
| 7,904,564 B2 * | 3/2011 | Pafumi et al. | 709/227 |
| 8,004,563 B2 * | 8/2011 | Talmon et al. | 348/155 |
| 8,275,647 B2 * | 9/2012 | Anisimov et al. | 705/7.27 |
| 8,352,516 B2 * | 1/2013 | Walter et al. | 707/809 |
| 8,407,329 B2 * | 3/2013 | Kim et al. | 709/223 |
| 8,543,564 B2 * | 9/2013 | Conrad et al. | 707/708 |
| 2003/0004746 A1 | 1/2003 | Kheirolomoom et al. | |
| 2003/0040943 A1 * | 2/2003 | Bates et al. | 705/5 |
| 2003/0084016 A1 | 5/2003 | Norgaard et al. | |
| 2004/0133457 A1 | 7/2004 | Sadiq et al. | |
| 2004/0230982 A1 | 11/2004 | Wookey | |
| 2005/0166180 A1 | 7/2005 | Lemon et al. | |
| 2006/0153173 A1 | 7/2006 | Beck et al. | |
| 2007/0021995 A1 | 1/2007 | Toklu et al. | |
| 2007/0088583 A1 | 4/2007 | Chen et al. | |
| 2007/0195704 A1 * | 8/2007 | Gonzalez et al. | 370/241 |
| 2007/0208587 A1 | 9/2007 | Sitaraman | |
| 2008/0115127 A1 * | 5/2008 | Hatano et al. | 718/1 |
| 2008/0141237 A1 | 6/2008 | Elad et al. | |
| 2009/0024514 A1 | 1/2009 | Kumaran et al. | |
| 2009/0100431 A1 | 4/2009 | Doyle et al. | |
| 2009/0150906 A1 | 6/2009 | Schmidt et al. | |
| 2009/0171729 A1 | 7/2009 | Anisimov et al. | |
| 2013/0022179 A1 * | 1/2013 | Anisimov et al. | 379/88.01 |

OTHER PUBLICATIONS

Plesums, Charles, *Introduction to Workflow*, Computer Sciences Corporation, Financial Services Group, Workflow Handbook 2001, Fellow, U.S., 20 pages.

*Workflow Management Coalition Reference Model Interface 4 Workflow Interoperability, The key to E-Commerce and to process scalability*, Working Group 4, 12 pages.

Muehlen, Michael Z. et al., *Workflow Classification, Embedded & Autonomous Workflow Management Systems*, Workflow Management Coalition, Mar. 10, 2000, 8 pages.

*Workflow Management Facility Specification*, Object Management Group, Inc., Version 1.2, New Edition: Apr. 2000, 96 pages.

*Web Services Business Process Execution Language Version 2.0, Oasis Standard, Oasis*, Apr. 11, 2007, 264 pages.

\* cited by examiner

METHOD FOR ASSEMBLING A BUSINESS PROCESS AND FOR ORCHESTRATING THE PROCESS BASED ON PROCESS BENEFICIARY INFORMATION

CROSS-REFERENCE TO RELATED DOCUMENTS

The present application is a continuation application of co-pending application Ser. No. 11/965,608, filed Dec. 27, 2007, disclosure of which is incorporated herein in its entirety by reference.

BACKGROUND OF THE INVENTION

1. Field of the Invention

The present invention is in the field of automated business and workflow management systems and pertains particularly to methods and apparatus for assembling a business process and dynamically integrating the process to business process resources and fulfillment services.

2. Discussion of the State of the Art

In the field of business process management, there are automated business processes that are executable and, in some cases, navigable by a process beneficiary, which may be a customer engaging the process through a customer contact interface of some kind. In the field of telephony communications, a customer interactive interface such as an interactive voice response system (IVR) might be used to interact with a customer using a voice application. A customer that has contacted the business via a telephone, for example, can navigate through one or more branches of a business process by selection, made by voice confirmation in many cases to voice prompted options presented to the customer through the voice application.

Much information on business process and workflow management can be found at the following Internet site references including the Business Process Management Initiative at www.bpmi.org; the OASIS Business Process Execution Language (BPEL) site at www.oasis-open.org; Workflow & BPM Research www.workflow-research.de; and the Workflow Management Coalition http://www.wfmc.org/.

A voice application may be used as a customer interfacing application that causes one or more business processes or process branches to occur based on customer input obtained during navigation of the application. A Web-based customer interface engine may also be used to interact with a customer through a Web page enabling the customer to initiate one or more processes or to navigate through two or more process branches depending upon input submitted by the customer.

If a process is enabled by a voice application, the customer may navigate the process by voice input using a specific vocabulary recognized by the voice application. If the process is Web-based, the customer may use text input and/or interactive selection to navigate the process. Other input methods can be used to navigate a business process like touch tone input for some IVR applications.

In many cases, the dynamic principles of an automated business process comprise the enablement of the customer to navigate various portions of the process to some end result such as a transaction, an order status report, or some other goal of a process branch. The customer can exit a process and begin again, follow a process branch to completion, move from one process branch to another, skip portions of the process and so on. Individual process step transitions and branch jump-off points may be input or result driven. Flexibility of the process is limited to pre-definition and process recognition of the process transition results and or process beneficiary input. One of the challenges in the industry is that, unlike internal-only processes such as manufacturing, customer service and sales processes involve customers, who are not agents of the enterprise and who likely will not feel bound in any way to follow established processes. Thus customer-interfacing business processes tend to be much more highly dynamic than the processes around which business process management techniques known in the art were developed.

In the case of a customer-driven business process, the customer ultimately is the process beneficiary regardless of the exact process contexts involved or whether the entire process is managed in one location. In traditional business process management systems the processes are pre-defined and orchestrated into hierarchal business steps, some of which depend on a previous result for execution and completion. All of the created process branches that may be classed in many cases as separate processes are static and can only be executed and navigated according to programmed design (process path). For example, if a customer wants to check the balance of her checking account at a bank using a telephone interface, the customer may have to navigate to that business process option or branch from the voice application interface or options menu. The customer may be required to listen to a host other options before the desired option is presented. Once on the right branch, the customer may have to listen to additional options for checking the balance of a savings account and an investment account before being able to select the option for checking balance.

The process described above although dynamically navigable through process branching from a start point or customer interface, is static in that it comprises certain pre-designed processes architected as a series of required steps. In order for the customer to initiate another process on the same telephone call, the customer may have to exit the process and start again at the beginning of the menu options. These types of processes may be thought of as "hard" business processes meaning that they are a pre-programmed series of steps that together complete some automated or semi-automated process. Navigating through an automated business process requires certain input or process results at certain points in the process.

A problem with the current business process presentation and navigation is that many customers become dissatisfied with a business process and many times quit the process before a transaction or other process goal is achieved. Process optimization focuses on fluidity of the process and the ability to navigate easily between various process branches. Often, when a customer contacts a business, they have more than one goal in mind, and each requires servicing. In some cases information about the customer can indicate that more than one process should be presented to the customer. Often treating the customer with a hard automated business process does not satisfy all of the needs of the customer at the time.

Some automated or semi-automated processes are performed in portions of one or more steps by different entities. One example might be the process of being able to use a new credit card. If one looks at a complete process from the point of application creation and approval to credit card shipment, receipt and activation, it is clear that more than one sub-process is involved in the overall process and different entities may be involved in enabling the different sub-processes. From a business standpoint the "experience" of getting credit is not thought of as a single overall process, but as a compilation of unrelated processes that all must be completed before the consumer can make a credit purchase.

Still other types of processes have process beneficiaries that are businesses or groups of users rather than single customers. An automated supply chain might represent such as process where the primary beneficiary is a business customer. Many of these processes are wholly automated and may comprise many sub-processes before the end result is realized. Where the process is automated, it requires some human intervention to change or modify the process. Like automated business-to-customer (B2C) processes, business-to-business (B2B) processes typically follow a specific pre-architected design that is result or input driven.

In most business processes navigated by customers, there is some event routing strategy that has to be defined and that is integral to the process. Many times automated routing routines are fixed sub-processes of the overall business process. In processes containing one or more required interactions, businesses can suffer bottlenecks if live or automated resources are not sufficient to handle all of the events resulting from process interaction.

It has occurred to the inventor that customers and business clients often have their own ideas and preferences relating to how they want to be serviced. Therefore, what is clearly needed in the art is a system and methods for dynamic assembly of business processes based on real customer need at the time of servicing and wherein process to resource integration is more flexible. A system such as this would improve customer experience and reduce unnecessary overhead related to servicing customers.

SUMMARY OF THE INVENTION

The problem stated above is that flexibility and improvement of the experience of the customer are desirable goals of any business process, but many of the conventional means for designing and managing business processes actually limit flexibility and personalization. The inventors therefore considered functional elements of a business process and means for enacting and managing the same, looking for design, execution and management methods that would promote more flexibility and that could improve the experience of a process beneficiary in a manner that would be economical and practical for the process beneficiary and the enterprise fulfilling the goals of the process.

Every business process can be thought of as a compilation of business process elements or steps that together enable a realization of some goal shared by the enterprise hosting the process and the process beneficiary of the process. Most business processes are hardwired processes requiring specific navigation paths and pre-specified treatment regimens relative to interaction workflow and process resource delivery. Although business process options are available in many processes where options selected lead to new process branches, navigation through the options still requires the operands tied to process results of previous interaction to move to a next step or branch in the process.

The present inventors realized in an inventive moment that if, at the point of introduction between an enterprise system and a process beneficiary, a business process could be assembled from a pool business process elements based more on the intent of the process beneficiary, significant flexibility and personalization of a process for that beneficiary might be achieved. The inventor therefore constructed a unique business process assembly and management system that allowed process beneficiaries to better control how they want to experience the process based on direct input and who they are as known to the system. Significant improvements in customer experience and satisfaction with business process navigation results, with noted reduction in unnecessary business process overhead and time to conclude the business process goal relative to each process beneficiary.

Accordingly, in one embodiment of the invention a method is provided for assembling a business process or a portion thereof according to process beneficiary information. The method includes steps (a) providing one or more business rules executable based on process beneficiary information to assemble a business process or a portion thereof, (b) providing modular business process elements subject to the one or more business rules, the elements specifying one or more steps of a business process, and (c) obtaining process beneficiary information resulting in execution one of one or more of the business rules of step (a).

According to another aspect of the invention, a system is provided for assembling a business process or a portion thereof. The system includes a rules base containing executable rules and defined business process elements, a workflow orchestration engine, and at least one interface available to a process beneficiary. Information known about and or provided by a process beneficiary interacting with the at least one interface is used to execute one or more of the rules causing assembly of a new business process or a portion thereof according to workflow orchestration rules the new or modified process directing servicing of the process beneficiary accordingly.

According to another aspect of the present invention, an integration system is provided for integrating a business process to one or more resources for satisfying one or more steps of the business process. The integration system includes a session path determination engine including a session start position, a plurality of session channel paths, a session follow-up position, and a session path end position, and a workflow orchestration engine. The integration system is characterized in that the session path determination engine decides the best session paths and processes for a process beneficiary interacting with the business process, and wherein such session processes and any sub-processes are dynamically incorporated into the business process by the workflow orchestration engine according to workflow orchestration rules.

According to another aspect of the present invention, a system for orchestrating a business process carried out by more than one service entity is provided. The system includes a rules base containing executable rules and defined business process elements, a workflow orchestration engine, and a network interface to the service entities. Each service entity receives from the system over the network interface a portion of the business process to be carried out based upon information received at the system about a beneficiary of the business process, the portions of the process then subject to dynamic re-orchestration based on additional information about the process beneficiary obtained by the enterprises and sent to the system over the network interface as the business process portions are in progress.

According to another aspect of the present invention, a method for assembling and orchestrating portions of a business process enacted and carried out by separate service entities. The method includes steps (a) obtaining substantive process beneficiary information to assemble and execute a business process from business process elements, (b) communicating portions of the business process to the appropriate entities that will carry out those process portions, (c) monitoring process beneficiary information as the portions of the business process are navigated at each of the entity locations, and (d) based on new process beneficiary information received from any one of the entities relative to any portion of the business process, re-orchestrating that portion of the business process to better serve the process beneficiary.

These and more detailed embodiments of the invention are taught in enabling detail below.

BRIEF DESCRIPTION OF THE DRAWING FIGURES

DETAILED DESCRIPTION

The inventors provide a system and methods for dynamically assembling a business process or modifying an assembled and running business process based on information received or known about a business process beneficiary. Modification of an assembled and running business process includes in some embodiments, dynamic integration of the process to business process resources and contact services. The system and methods of the invention will be described in enabling detail using the examples that follow.

Figure 1:
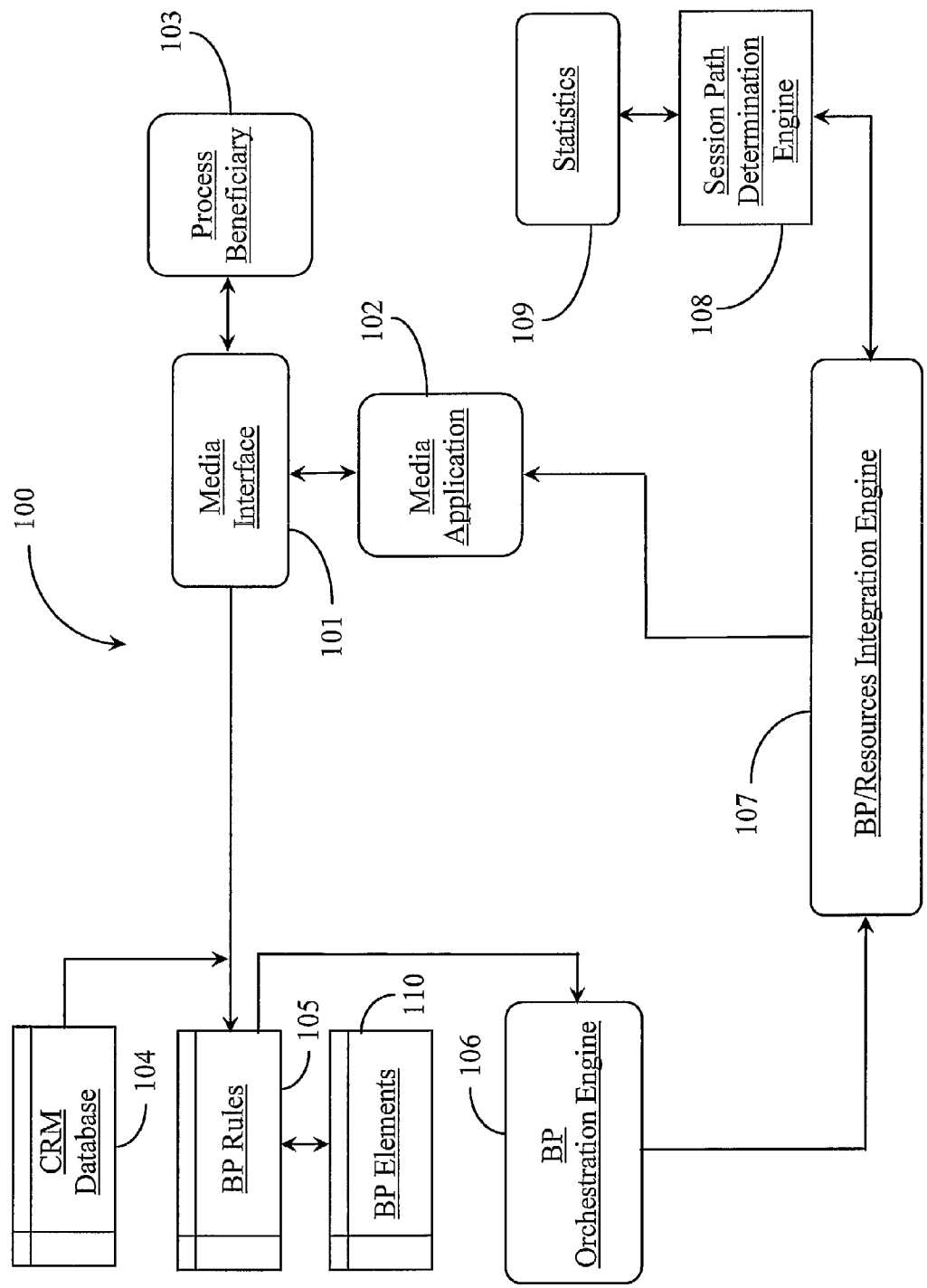
FIG. 1 is a block diagram illustrating assembly of a business process and integrating the process with contact workflow according to an embodiment of the present invention.

FIG. 1 is a block diagram illustrating assembly of a business process and integrating the process with contact workflow according to an embodiment of the present invention. A business process assembly and integration system 100 is illustrated in this example. System 100 is adapted for building a business process based on information received from or known about a business process beneficiary illustrated herein as process beneficiary 103. Process beneficiary 103 may be a single individual that is a customer benefiting from the assembled business process. In another embodiment described later in this specification, process beneficiary 103 may be an enterprise or an information system.

In this example, process beneficiary 103 is a customer of a business interacting with the business through a media interface 101, which may be an interactive voice response (IVR), an instant messaging server, or some other bi-directional media interface. System 100 includes a data repository 105 for storing business process (BP) rules. Repository 105 may be part of a server-based system that has access to media interface 101. Repository 105 contains business process rules that are executable by information that may be obtained from media interface 101 while interacting with process beneficiary 103 or that may already be known about the process beneficiary.

Business process rules, hereinafter given the element 105 each broadly define a business process or at least a portion of a business process. For example, a business process rule 105 may broadly define a credit application process and may be executed by a trigger from media interface 101 such as the phrase "Apply for credit" or perhaps the keyword "Credit". Another of BP rules 105 might broadly define a technical support process and may be executed using a phrase such as "I need help" or perhaps a single keyword "Help". A business offering services may create any number of executable BP rules 105 that in aggregate define all of their business processes in a broad way. In practice of BP rule execution, the input for executing a BP rule may be provided by process beneficiary 103 during interaction with media interface 101, the trigger either entered directly as text or automatically recognized such as by using voice recognition software. In one embodiment, a BP rule may also be executed by information about a process beneficiary that is known or discovered by the system without requiring media input from the process beneficiary. In another embodiment touch tone, text (via SMS, instant messaging, email, and the like), or some other input may be used.

System 100 includes a repository 110 for storing business process (BP) elements hereinafter given the element number 110. Like the BP rule repository, the BP element repository may be part of a server-based system that stores and serves business process elements. Business process elements may be defined as components that define steps or portions of a business process. Business process elements 110 may be assembled together in some hierarchical fashion to create a functioning business process. A business process element may define a context portion of a business process. A business process element may also describe a contact workflow portion of a business process.

A context business process element may include one or more pre-programmed steps that complete a particular business context. A contact business process element or a "contact workflow element" may include one or more steps for initiating and establishing interaction between a business process beneficiary and a business process resource or fulfillment entity, or with the business process and a business process resource, or with a business process and another business process.

A BP rule 105 may reference significant BP elements 110 for assembling more than one version of the overall business process broadly defined by the rule. For example, a BP rule defining "Credit Application" may point to BP elements associated with applying for visa and master card, BP elements for applying for a personal loan, and BP elements for applying for a credit line. All of these are separate credit application processes that may be possible to assemble from execution of the single BP rule. According to additional input and/or information, the exact business process assembled for a process beneficiary will likely use some of but not all of the business process elements pointed to by the business process rule executed.

System 100 includes a customer relation management (CRM) database that may hold information about process beneficiaries like beneficiary 103, for example. CRM database 104 may contain purchase records, interaction history, contact data, financial information, and other customer information. A customer information system (CIS) might be provided in place of or in addition to CRM system 104. In practice of BP rule execution, if process beneficiary 103 is already known to the system, that information may be leveraged for BP rule execution and exact business process assembly. If the beneficiary is not initially identified, the business process can begin without it, and then take it into account later when, and if, the identification of the process beneficiary becomes clear, thus as by execution of a further business rule.

System 100 includes a business process orchestration engine 106. Orchestration engine 106 is adapted to assemble more than one business process element 106 according to proper orchestration and provided information including rule-based instructions. BP rules repository has connection to the BP elements repository so when a BP rule executes, its first priority is to gather or at least locate all of the referenced BP elements for assembly. The rule executed may be provided with any input from, and information about, the process beneficiary to help determine, for example in a credit application embodiment, which credit application process the process beneficiary needs and/or desires to pursue.

The exact process that will be provided to assist process beneficiary 103 is assembled by BP orchestration engine 106 at least based on the overall business context. In one embodiment, an assembled business process is a complete process but may be enhanced or optimized by dynamic integration of the process to BP resources and/or contact resources that may be dependent on state of availability, best fit, or the like so that the process beneficiary enjoys the most effective interactions and receives the best possible services. Default contact workflow steps may be defined as business process elements in the business process rule. In one embodiment those default processes may be changed according to current statistics before of after a process is implemented.

System 100 includes a business process resources integration engine 107. Business process resources may be defined in a broad way as any resource that might be required for completing or concluding a business process or a portion of the process. A BP resource might be some system information that is required before the process can move forward. A point in the process would be reserved for retrieving that information. Another BP resource might be a live attendant who performs some function at some point in a process like a credit check, for example. Another business process resource might be an automated system or live agent that can inform a process beneficiary of the overall status of an ongoing process, or that might be integral to the process itself, fulfilling some element of the process to complete a goal of the process or a portion of the process.

An assembled business process may be implemented without integrating the process to process resources or contact services if business process elements such as contact workflow elements already exist as BP elements in 110. However, to improve the experience of the process beneficiary, the inventor has created a system for dynamic integration with the most current resources and contact services based in part on best fit criterion and in part on process beneficiary information that is obtained before a process is executed. BP integration engine 107 receives an assembled business process from the BP orchestration engine. BP integration engine 107 is connected to a media application server (MAS) 102 in this example, which may be a voice application server, an instant messaging dialog server, an email server with scripting, or the like. If no process integration is required for a particular business process, then the orchestrated business process can be forwarded directly to MAS 102 for implementation. Process beneficiary 103 may then interact with the business process through media interface 101.

In one embodiment, contact workflow is determined by a session path determination engine 108. Determination engine 108 is adapted to provide a contact workflow or contact workflow elements to specified points in the assembled business process. In one case, the assembled business process is already complete with contact workflow and determination engine 108 determines if any existing contact workflow steps or sub processes should be replaced by new processes. In another embodiment, the assembled business process contains context business process elements only and the appropriate contact workflow elements are inserted into the process by the session path determination engine.

Determination engine 108 is connected to or has network access to a statistics server 109. Statistics server 109 is adapted to serve statistics related to contact center functionality. For example, most current agent availability state over a voice channel may be one of the statistics reported by statistics server 109. Determination engine 108 includes a session model (illustrated further below) that provides a defined view of all of the interaction functionality that is available to process beneficiary 103 during interaction with the business process. In practice of the invention, it is the responsibility of session path determination engine 108 to provide the best interaction options and contact workflow to the business process at the time of execution of the business process except when the process either does not call for any contact workflow steps or is deemed fine with the existing or default workflow defined in the business process rule as contact workflow element.

In this example, business process beneficiary 103 is interacting with a business process by voice through media interface 101. However, other communications channels may be used to interact with a business process such as email, IM, fax, telephone, VoIP, chat and others without departing from the spirit and scope of the present invention. In this particular example, an integration to contact center services focusing on live interaction is illustrated for discussion purposes only. The business process may also be integrated to process resources that may be generic to the process host organization.

Figure 2:
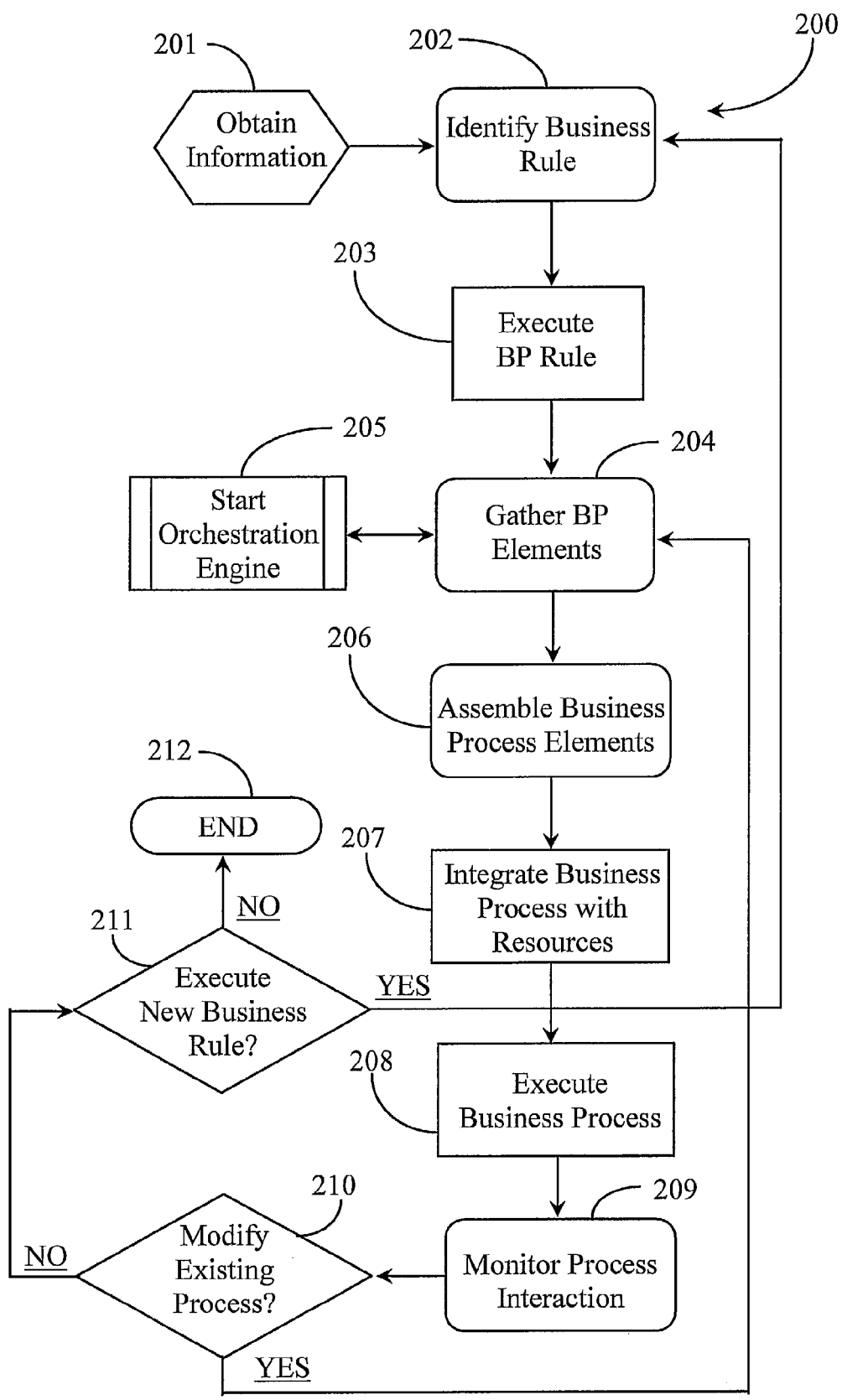
FIG. 2 is a process flow chart illustrating steps for assembling a business process and integrating the process with contact work flow and performing process management during navigation of the process.

FIG. 2 is a process flow chart illustrating steps 200 for assembling a business process and integrating the process with contact work flow and performing process management during navigation of the process. At step 201, the system obtains information about the process beneficiary, which may be a customer. Information obtained may be a response to an IVR prompt by an IVR system. Information obtained may be some information already available about the process beneficiary. A combination of both of the above may be the information obtained.

The information obtained is for use in identifying a BP rule at step 202 and for executing the business process rule at step 203. Once a business process rule is executed, it will gather all of the BP elements that can be used to build a version of the process described by the rule at step 204. Individual business process elements may include built-in orchestration rules that may dictate what elements can be coupled with other elements to make a pure version of a process. In one embodiment an orchestration engine is called at step 205 to provide the actual assembly order of the business process elements into a business process based on the orchestration rules.

Using the orchestration engine, the system assembles the required business process elements at step 206. For a BP rule, the exact determination for what business process elements are absolutely required and selected for assembly into a business process is made according to information about the process beneficiary and information contained in the BP rule. At this point in the process, the business process may be complete and can be executed by the system. If so, step 207 may be bypassed and the process may be executed at step 208.

Optionally, the assembled business process of step 206 is integrated with business process resources at step 207. Process resources may include contact services defined as contact workflow elements that may be inserted into or added to the process. Business process resources may be broadly defined as any resource that might be required to conclude a business process or to move that process to a next step or level.

Contact workflow may be broadly defined as a process for initiating and accessing a business process resource to conclusion. Typically contact workflow may be thought of as the workflow required for transferring a call to a live agent, for example. A contact workflow may entail the steps required to access a database and retrieve some information required for the process to move to a next point or step.

Once the business process is integrated with the appropriate contact workflow, the process is executed at step 208. In the example of FIG. 1, the process is a media application and is executed for example through an IVR system at the time that the process beneficiary is ready to interact with the process. However, the process may be a Web-based process rather than a voice-based process. Other types of process interaction interfaces are also available for interacting with other types of business processes.

Once the process is initiated at step 208, the process interaction is monitored at step 209. For a voice system interface, monitoring the process involves recording process beneficiary input and behavior as well as process direction and results. For other types of interfaces monitoring is performed differently based on the technology supporting the process. For example, a web form process can be monitored by recording user typed input and database results returned after form submission and so on.

While a process is underway and being monitored, the system makes a determination based on some result of monitoring if the existing process should be modified at step 210. For example, for a voice application, the failure to respond to a prompt correctly may indicate confusion on the part of the process beneficiary leading the system to make a determination if the process should be dynamically modified at step 210.

The inventors describe a business process that is executable using a media application in FIG. 1 because it clearly illustrates a business process that has at least one interaction point with a process beneficiary. Many steps of the actual process may be performed in the background with only steps requiring some input from the process beneficiary presented to the beneficiary through the voice interface. However, a business process may be monitored for results both at steps performed transparently to a beneficiary and at steps where an interaction occurs between the beneficiary and the process or between a beneficiary and some other process resource where the interaction is part of the overall process. The inventors intend that the invention may be practiced with any type of business process including linked business processes that include at least one step where input is required to further the process.

If at step 210, the system determines that modification of the process is necessary, then the process resolves back to step 204 where business process elements are gathered to build the process modification. Unlike process branching or linking, the system can determine by analyzing results from monitoring that some other sub-process should be executed rather than one currently underway or just concluded. An example might be that a process beneficiary becomes impatient with a specific portion of a process or that the specific sub process does not meet the current need or desire of the process beneficiary. In such a case, different or optional sub processes may be pre-defined in the executed BP rule, each of those sub-processes defining their own set of business process elements. In one embodiment, the input may be that the process beneficiary is audibly upset. The system picking this up can determine that a process modification is required and can assemble a sub-process that connects the process beneficiary to a help or information resource. Steps 206 through 208 are then repeated for building integrating and implementing the sub-process.

At step 210 if it is determined that the process does not require modification, the system may determine if a new BP rule defining another process needs to be executed. If no new BP rule needs to be executed at step 211, then the existing process may conclude at step 212. If the system determines through system monitoring that a new BP rule needs to be executed then the process resolves back to step 202 based on the new information obtained through monitoring. An example might be that the process beneficiary has successfully applied for a visa card and before terminating the process, asked about refinancing information. The BP rule identified at step 202 may be one that broadly defines the mortgage refinancing processes available to the process beneficiary. In this case, the old process is concluded but the beneficiary will now engage a new process for refinance.

Steps 210 and 211 can happen at any time during a process life time after process monitoring begins. It is important to note herein that at step 212, a new BP rule may be identified and executed resulting in assembly and execution of a new process that may run alongside a process the beneficiary currently has running that is not yet concluded. To give an example, a process beneficiary may be engaged in a process to buy a car and is navigating through the forms wherein at one point the system determines that car insurance through the sales company will be required at which point the system may identify and execute a business process rule for obtaining the insurance coverage. That process may run alongside the process of obtaining and submitting the beneficiary information required by the loan department that will finance the purchase.

Based on information already known about the client from the previously executed process, the orchestration engine may select the business process elements for obtaining insurance from the least expensive of three different insurance providers. As long as the abstract processes are defined in the business process rule and the business process elements are identified in the rule and are available for assembly, the system can quickly assemble and execute a new process or sub-process on behalf of the process beneficiary.

In one embodiment of the present invention, certain assembled business processes can be reused by process beneficiaries through personalization of a business rule associated with a previously assembled and implemented business process. For example, a process beneficiary such as a customer of a flower shop may have used an automated attendant to buy and ship flowers to someone. The customer might have been greatly satisfied with the process at the conclusion of the process. The system may prompt the customer at the end of the process to determine satisfaction state of the customer and to ask if the customer wishes to personalize this exact process. If the customer elects to "personalize" the process the customer may tag the process for example by saying "My Mothers Flowers" and the system can associate a piece of identification like a telephone number or some other unique identifier to the tagged process. The system may then save the process for that customer and may implement the same process the next time the customer calls and speaks the tag phrase.

Figure 3:
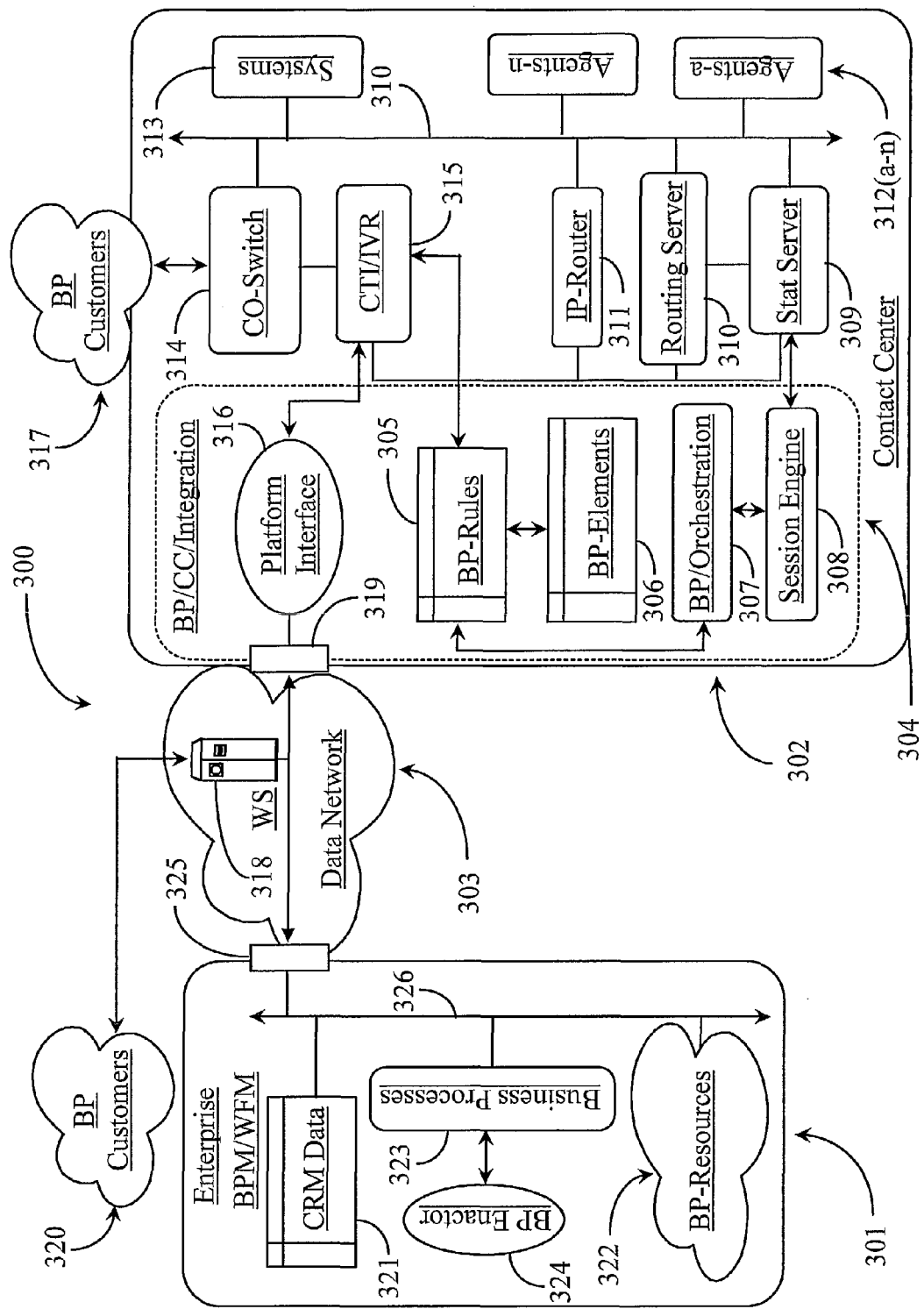
FIG. 3 is a block diagram illustrating components for third-party business process management services according to an embodiment of the present invention.

FIG. 3 is a block diagram illustrating a network-based system 300 supporting third-party business process management services according to an embodiment of the present invention. System 300 includes an enterprise 301 that may offer business process management (BPM) and/or Work Force Management (WFM) services to customers. Enterprise 301 may be a third-party enterprise offering business process management and/or workforce management services to other enterprises. Such as system is typically adapted to provide the capability for an enterprise to better manage its operations using third-party process and workforce management systems. In one embodiment, enterprise 301 is simply an enterprise that performs one or more business processes for one or more process beneficiaries, who may be customers of enterprise 301 or customers of some other enterprise that contracts with enterprise 301 for services.

System 300 includes a contact center 302 that is adapted primarily to provide contact services to enterprise 301 on a contract basis. In this embodiment, contact center 302 is also enhanced according to an embodiment of the present invention to enable dynamic process assembly and "in-process" modification services for enterprise 301.

Contact center 302 includes a local area network (LAN) 310 that supports contact center communication equipment and live contact service agents illustrated herein as agent groups 312(a-n). Agent groups 312(a-n) are connect to LAN 310 through agent stations, typically agent desktop computers and other IP telecommunications equipment such as IP telephones (equipment not illustrated). Agent groups 312(a-n) may also be connected to a central office (CO) telephone switch illustrated herein as CO/Switch 314 via telephones.

LAN 310 also supports automated systems 313 such as automated fax, chat, messaging, and email systems. CO switch 314 is computer telephony integrated (CTI) and may include an IVR interface provided by an intelligent peripheral CTI/IVR 315. LAN 310 supports an IP router 311 and a routing strategy server 310. A statistics server 309 is illustrated in this example as well and provides statistics about communications load on agents and systems, estimated waiting time (EWT), average time to answer (ATA), agent availability statistics, and other contact center operations statistics. Contact center 302 is a full service contact center that provides state-of-art services to enterprise clients like enterprise 301.

Contact center 302 is connected to enterprise 301 via a data network 303, which may be a corporate wide-area-network (WAN), a dedicated private or proprietary data network tunnel or a publicly accessible data network like the Internet network, for example. In one embodiment, data network 303 is the Internet network and contact center 302 provides Web-based contact services to enterprise 301 as well as telephone contact services. Terminal network nodes 319 and 325 are illustrated in this example enabling data network connectivity between enterprise 301 and contact center 302. Nodes 319 and 325 may be proxy server nodes adapted to enable dedicated data transfers between contact center 302 and enterprise 301 in a manner that supports system federation.

Enterprise 301 includes a local area network (LAN) 326. LAN 326 supports business process resources 322. BP resources 322 may include information systems such as servers that provide information to a process and live assistants that provide some required input to a business process. BP resources may include a workforce of live knowledge workers or support personnel that are involved in supporting a business process that requires some live input or interaction between parties involved in the process whether the parties are systems, a system and a human or two humans.

Enterprise 301 includes a business process server or store 323 connected to LAN 326. Business process store 323 contains, in this example, fully enabled business processes. Enterprise 301 contains a business process enactor 324 that executes business processes from store or server 323 according to normal business rules. Enterprise 301 contains a customer relations database (CRM) 321 connected to LAN 326. CRM database 321 contains information about customers of enterprise 301. Process beneficiaries (BP customers) of enterprise 301 are illustrated as BP customers 317 and BP customers 320. BP customers 317 are illustrated as those customers that may engage or initiate one or more processes 323 and that may interact with the process and/or may check status of a process through contact center 302 using a telephone or other voice channel.

BP customers 320 are illustrated as those customers that may engage or initiate one or more processes 323 and that may interact with the process and/or may check status of a process through a Web server illustrated herein as Web server 318. Web server 318 may be hosted by enterprise 301 or by a third party service. The enterprise may maintain one or more Web sites in server 318 through which enterprise customers may initiate a business process or check the status of an ongoing process. Contact center 302 may provide enhanced BP services in addition to contact center services through enterprise Web pages hosted on server 318. Contact center 302 is adapted to provide enhanced BP services to enterprise customers in a manner that improves the experience of the customer or process beneficiary through dynamic process building, modification, and dynamic execution.

In one embodiment, contact center 302 includes a business process/contact center (BP/CC) integration platform 304. Integration platform 304 includes most of the components described in FIG. 1 further above. Integration platform 304 is adapted primarily for integrating business processes 323 in enterprise 301 with contact center services. In this example, integration platform 304 also provides business process "enhancement" services to enterprise 301 in a manner described according to one aspect of the present invention above.

In this example, platform 304 includes a platform interface 316. Platform interface 316 provides universal connectivity between systems in enterprise 301 and systems in contact center 302. Platform interface 316 is connected to CTI/IVR 315, which in turn has connection to all other contact center systems and equipment including a connection to a BP rules database 305 in BP/CC integration platform 304.

In one embodiment, enterprise 301 provides contact center 302 with data defining all of the business processes of the enterprise. At contact center 302 in BP/CC integration platform 304, BP-Rules are created for all of the enterprise business processes. BP elements are created for each of the BP rules and are specified in their associated BP rule. Rules of orchestration are also created for each of the business processes and BP-elements. All of the business processes enterprise 301 has in place are now dynamically buildable from BP elements specified in an executable BP rule. Moreover, each business process of enterprise 301 can also be monitored and modified on the fly according to input or information about BP customers or process beneficiaries.

In one embodiment, enterprise 301 may contract with contact center 302 to have all business processes dynamically managed by the contact center as well as all contact services. In practice, a BP customer of enterprise 301 may desire to initiate and engage in a business process of enterprise 301. The initiation of the process might be by any form of contact like email, telephone, Web form, Fax, VoIP, etc. Contact center 302 will receive the contact because it provided all of the contact services for the enterprise.

Based on input made by the BP beneficiary and any other useable information about the beneficiary, the contact center can identify and execute the appropriate BP rule 305 that broadly defines the business process and specifies the business process elements that can be used to build the process. The business process can be built, orchestrated, and integrated with contact services all at the location of contact center 302. The business process may be sent from contact center 302 over data network 303 to enterprise 301 where it may reside in business processes 323 as an executable process that can be enacted locally. Unlike a static business process tree, the process built at center 302 is dynamically manageable by contact center 302 according to process beneficiary information and results of process interaction monitoring. In practice then, the process may run in enterprise 301 and be dynamically managed from the point of contact center 302.

To illustrate the above described functionality, consider that a BP customer of enterprise 301 wishes to start a loan process by submitting an email containing a request to apply for a loan for enterprise 301. That email would be intercepted by contact center 302 because it is handling all contact services for the enterprise. The email address of the BP customer might be used to search CRM database 321 at the enterprise location so that contact center 302 will have some more data to work with. Customer information and customer intent (derived from email request) may be used to execute a BP rule 305. Rule 305 specifies the BP elements, gathers them and calls orchestration engine to assemble the process.

In one embodiment, the process may be integrated to contact services using the session determination engine 308 to insert the best contact workflow into the process according to latest contact center statistics from stat server 309. In one embodiment the finished business process may be delivered to enterprise 301 and stored in business processes 323. BP enactor 324 may enact the process on behalf of the BP customer who requested the process.

In this example, all of the customer/enterprise interaction relative to the overall process is handled by contact center 302. Therefore, the process may be tracked and monitored in terms of how the customer is doing with the process. For example, after the loan process is enacted at enterprise 301, at a first contact workflow point in the process, an outbound call to the customer might be suggested in order to obtain some updated information to enable a qualification step for example. At that point in the process, the enterprise sends a request to contact center 302 with the customer's telephone number and instructions about what information is needed.

The request can be formatted as an XML-based request intercepted by CTI/IVR system 315. The request may be just one of many that are being received at contact center 302 for use in an outbound call campaign to multiple loan applicants involved in loan processes with the enterprise. CTI server 315 may and the request to the call load of an outbound dialing server and the outbound call is made with IVR functionality and routing strategy provided by routing server 309. When the customer picks up the telephone the attendant routes the call to an agent group such as group 312a or 312n, for example where an agent will take the call and ask the customer for certain information required. At the same time, the agent can give the customer an updated status report on the overall process. Enhanced functionality is available concerning process options that would not be available without the present invention.

For example, if current statistics indicate that the outbound campaign is currently full and no agents are available, then the loan process may be dynamically altered by swapping out the outbound telephone process step with an outbound email process step. In this case, the modification can be delivered to enterprise 301, which is running the loan campaign and all of the process instances running where the particular step has not yet occurred can be modified by replacing the step with the new outbound email process step. In one embodiment, a contact workflow process step includes some prioritized contact options that order the outbound telephone call first, an outbound email second depending on statistics. In that case, the contact option divergence does not necessarily call for a process modification.

In one case, if the customer engaged in the loan process is connected to a live agent and during the course of obtaining the customer information required, the customer decides that the loan is not the right solution; the agent may be prompted with a "soft process" built from BP elements according to the BP rule for "Credit". The soft process can be assembled on the fly and can be presented to the agent handling the session as a script or some other visual indicator like a "toast" for example, which is a pop-up window that appears and then disappears.

One with skill in the art will recognize that there are many ways to present information on a desktop interface. The "soft process" may be determined based on the systems or the agents sense that the customer does not really want to go through with the loan application and may abandon the process. Therefore, it may be desired that the possible state be determined earlier in the process rather than later in order to save time and money. The soft process may be a script that presents as one or more prompts for the agent to give the customer.

An example of such a script might be presented as a floating window on the agent's desktop. The script might confirm that the customer is experiencing some discomfort—"Perhaps this loan is not right for your current situation", "Would a credit line solution or a credit card solution interest you instead? As a soft prompt, the agent has flexibility in the exact delivery and can provide some supporting evidence depending on the circumstances. The customer can continue the loan process, abandon the loan process, or switch to a new credit process like applying for a credit line which would be a separate process for applying for a traditional collateral loan, for example. The new process can be built from business process elements under the same general "Credit" BP rule already executed so it may be considered a process modification. Some of the BP elements will be the same and may have already been fulfilled by the customer in the other process that was abandoned. That information may be automatically applied to the new process saving time for the customer.

The exact chain of required interaction for a process is not particularly relevant to the present invention, but the ability of optimizing the exact contact workflow in the process based on statistics is relevant to the invention. The contact center may update enterprise 301 with all of the processing and session interaction states and results as process interaction continues.

Process management might also include using contact center services for allocating BP-resources at enterprise 301. A business process enacted for a customer may include one or more steps for human intervention during the process where the customer is not necessarily involved. If statistics regarding those human BP resources are available from enterprise 301, then contact center 302 can use those statistics and can use the session determination engine to determine the best contact workflow for the human to process interaction steps whether the interactions occur online or offline. The BP resources are considered alongside contact center resources and the BP resource routing information has to be known for all supported media and system channels at the enterprise.

In one case, the enterprise may need to allocate suitable BP resources to work specific parts of an overall business process. The enterprise can use contact services of center 302 to make those assignments by email, IM, telephone alert, or other methods. In one embodiment customers engaged in ongoing business processes can obtain current status of their processes through contact center 302. Customers of enterprise 301 can be connected to agents and to business process resources for in process interaction and for off process interaction. Contact center agents can be connected to BP system and human resources. During any point in process tracking and monitoring, it is possible that an entirely new process may be assembled, integrated with contact services, and implemented for a BP customer of enterprise 301. Soft processes can include up sell opportunities, cross sell opportunities, service re-direction opportunities, and others.

In the case of enterprise 301 running a single process campaign such as a loan campaign, it is possible that every customer applying can have a somewhat personalized experience relative to process step orchestration, soft process opportunities, and preferred media channel routing and session interaction. Some customers prefer dealing with the automated attendant and some may simply prefer live attendants. Likewise there may be system recognizable reasons for performing a particular version of a process over another version. These reasons may be based on data input into the system directly by the customer and based on information already known about the customer.

In this example, an enterprise such as enterprise 301 may contract some but not all services out to contact center 302 including business process management services. That is to say that some BP customers may interact with the enterprise engaged in the enterprise standard business processes while others may interact with the enterprise through contact center 302 engaged in dynamic business processes assembled for the customer on the fly by the center. In this case, customers who become disenchanted with the standard hard-wired processes may be de-directed to the center and may then engage a more personalized process.

Figure 4:
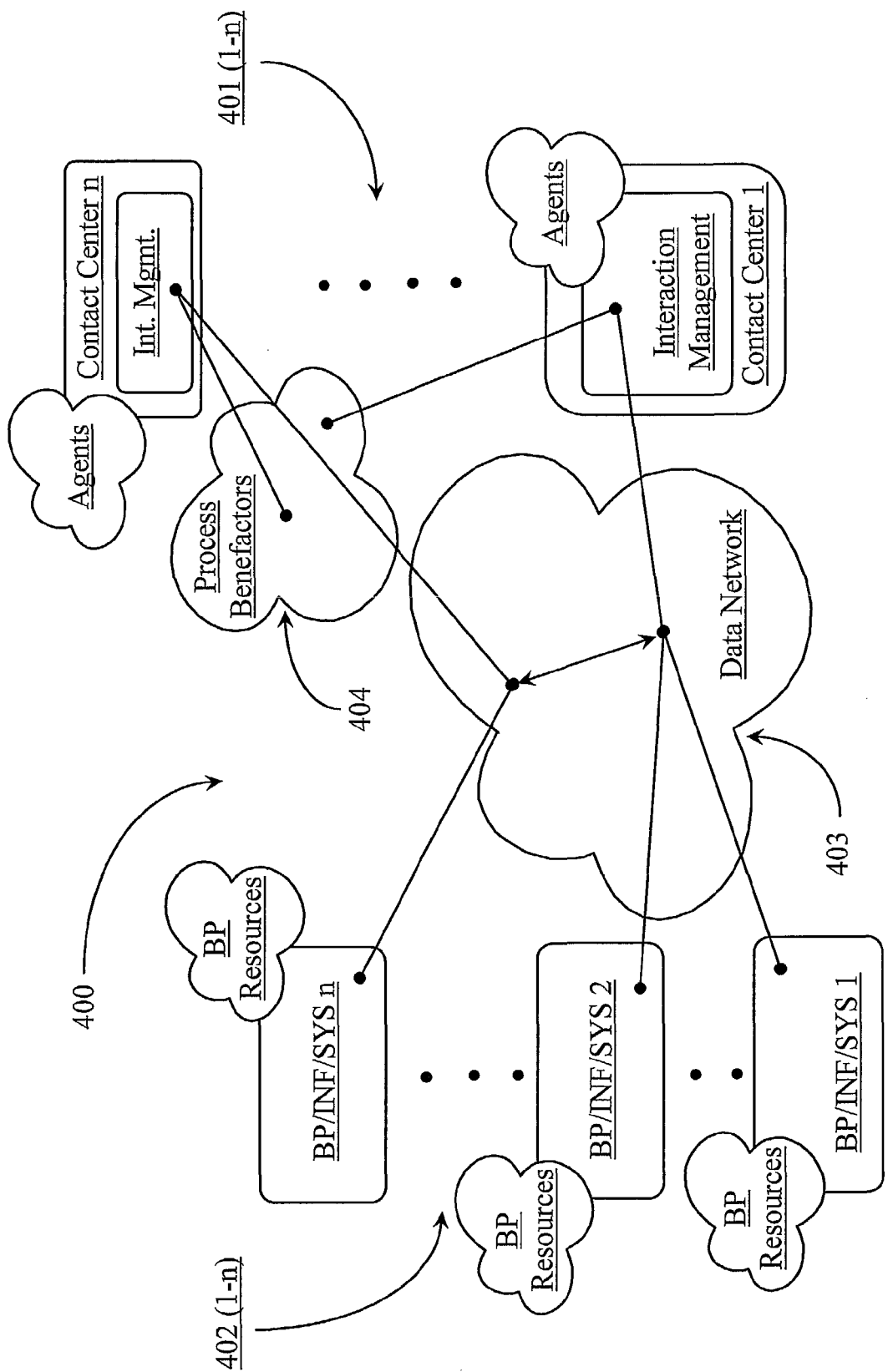
FIG. 4 is a block diagram illustrating components for third party business process management services in a federated environment.

FIG. 4 is a block diagram illustrating components for third party business process management services in a federated service chain network 400. Federated service chain network 400 includes more than one entity 402 (1-n) that may provide part of an overall business process. Entities 402 (1-n) may be separate enterprises or information systems that each handle a portion of a larger business process. For example, buying a house can be thought of as an overall process involving more than on service organization. A real-estate agency may be one entity, a mortgage company may be another entity, a title company may be another entity, and an insurance company may be another entity. A service chain may be characterized in all of the services required to conclude an overall process where the services (separate business processes) are linked together defining the overall process in general.

Another relevant example might be a supply chain for a particular type of product like an automobile. For example, the design of the automobile may be performed by one entity, the manufacturing of the chassis may be performed by another entity, manufacturing of the engine components may be performed by another entity, and assembly may be performed by yet another entity. An entire business process from the standpoint of a client includes all of the steps from design to rolling the car off of the assembly line.

Federated network 400 includes more than one contact center 401 (1-n). In a federated network such as network 400 an overall process may be initiated with a first enterprise 402 (1) and may be completed by a last entity or enterprise 402(n). In this example, contact center 401 (1) handles interaction management and business process services for both enterprises 402 (1) and 402 (2) and contact center 401(n) handles interaction management and business process services for enterprise 402(n).

Process beneficiaries 404 are illustrated in this example and represent individuals or enterprises that are beneficiaries of one or more overall processes involving input from entities 402 (1-n), which may be separate enterprises or at least, separate systems. Process beneficiaries 404 may call contact center 401 (1) to initiate an overall process beginning at enterprise 402 (1) in this example. The process portion handled by the first enterprise may be assembled, integrated with contact workflow and implemented through the contact center. While the process is being carried out, contact center 401 (1) may play a role in monitoring the process and providing contact center services for the process where required. Process beneficiaries may call center 401 (1) to check status of the process at entity 402 (1) and at entity 402 (2).

Contact center 401 (1) may control two legs of the overall process on behalf of a process beneficiary through process monitoring and through additional information gleaned from the beneficiary directly or indirectly while the overall process is underway. While the overall process is being carried out at the entities covered by contact center 1, the process beneficiary is given contact information of center 1 for checking status of the process or for any other concerns. When the overall process moves into the domain of entity 402(n), the process beneficiary is given the contact data for center 401(n).

In this system, centers 401 (1-n) and entities 402 (1-n) may share information through a central service in data network 403 or directly with each other on a federated network. The overall process is driven by the needs and preferences of the process beneficiary through the capability of assembling and manipulating process portions on the fly for the beneficiary. All of the previously described functionality is available in a federated embodiment and the overall process may be manipulated on the fly at any service point in the chain. In a federated embodiment, at least the contact centers would be federated and could exchange real-time information as processes are monitored for a process beneficiary.

It is important to note here that not all processes are serial processes. Many processes have one or more portions running in parallel where those separate portions of a process do not depend on any result from the other portion. Centers 401 (1-n) can route process beneficiaries to business process resources, center agents, automated systems, and can change business process orchestration on the fly relative to each of the client enterprises based on any new information. A key goal is to provide an overall experience that is customer-centric or even customer-driven. For example, results of monitoring a process portion at 402 (1) including any new process beneficiary input or information might result in "on the fly" assembly or re-orchestration of the process portion fulfilled by enterprise 402 (2).

Figure 5:
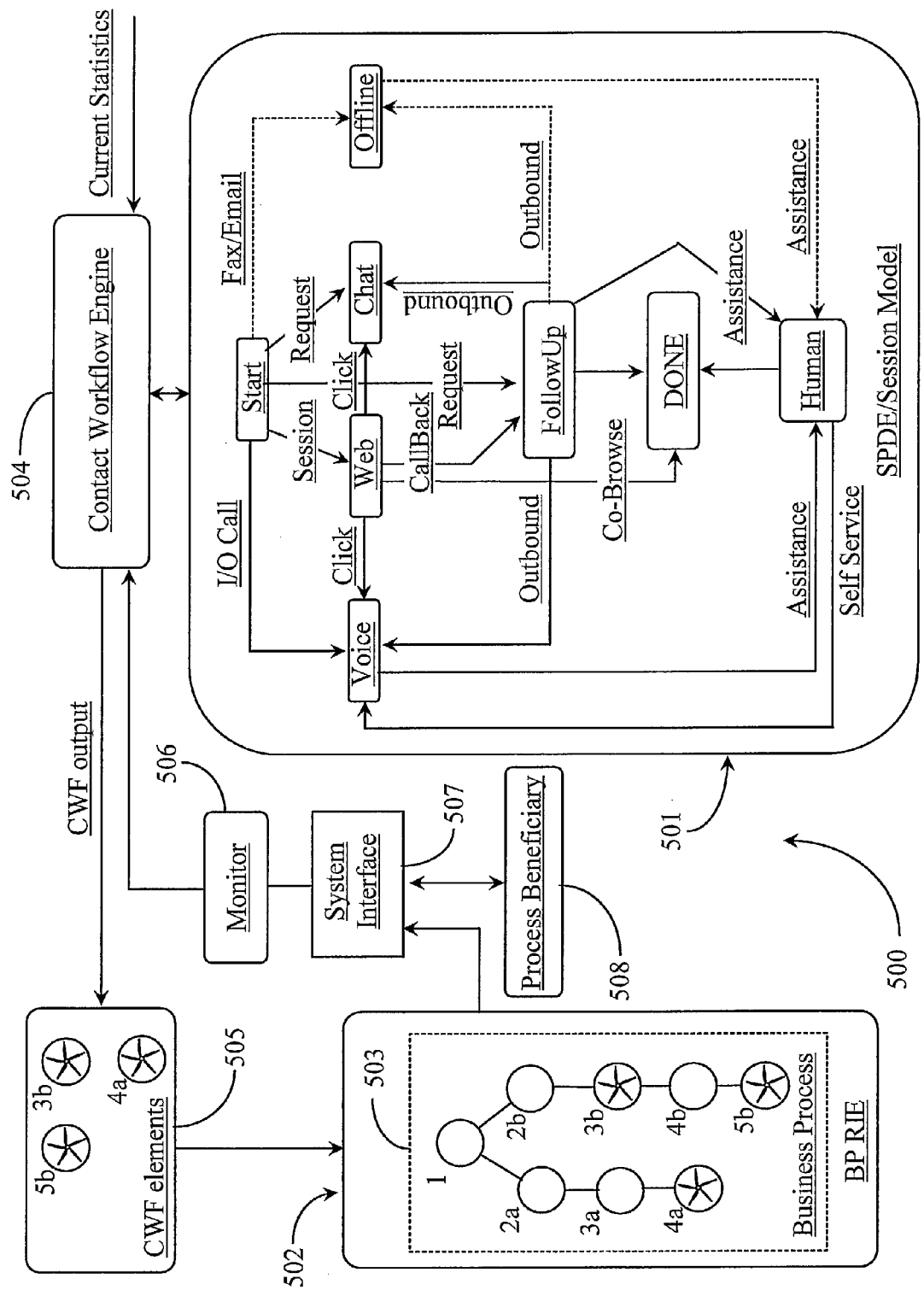
FIG. 5 is a block diagram illustrating business process dynamic integration with contact work flow sub processes according to an embodiment of the present invention.

FIG. 5 is a block diagram illustrating business process dynamic integration with contact work flow (CWF) processes and sub-processes according to an embodiment of the present invention. A dynamic business process (BP) contact workflow (CWF) integration system 500 is illustrated in this example and includes a business process/resource integration engine (BP RIE) 502 containing an assembled business process 503 before or after process execution. BP RIE 502 is analogous to integration engine 107 described further above with reference to FIG. 1. Contact workflow elements may be provided as business process elements by default as described further above. In another embodiment, only the context steps of a business process are assembled prior to integration whereby the "best" contact workflow elements are identified and inserted into the process before execution. In both embodiments, the elements may be changed according to information received during process interaction. Contact workflow elements are processes that may include optional sub-processes that may be defined, at least in abstract model, according to contact workflow rules and business process rules.

In this example, a contact workflow engine 504 is provided as part of a session path determination engine (SPDE) analogous to the session path determination engine 108 described further above in FIG. 1. Contact workflow engine 504 has access to a session path model 501 (shown in abstract) illustrated herein that includes a star position and a plurality of available process channels including a voice communications channel, a web communications channel, a chat communications channel, and an offline communications channel. Session model 501 further includes a human assistance option, a follow-up option, and a done position. Session model 501 is used to assemble the best possible contact workflows based on contact center statistics and, perhaps other information such as presence information, and process beneficiary information.

Business process 503 contains three interaction or contact workflow points in the process. It is noted herein that process 503 branches after step 1 and that one of the contact workflow points is on the process branch beginning with step 2a and the other two contact workflow points in the process are on the branch that begins with step 2b. If default contact workflow elements are provided in the assembly of the process before the process is executed, then system 500 may be used to replace one or more of the contact workflow elements in the process on the fly. Another option is that system 500 provides the best contact workflow elements at the time before process execution just before the process beneficiary will interact with the process.

Exemplary session paths are illustrated between the various session model elements start, voice, web, chat, offline, follow-up, done and human assistance. There may be many more session paths and sub-processes included in session model 501, the inventors only illustrate the abstract basic model and a few session paths. When a process requires, contact workflow engine 504 consults session model 501 and according to current statistics and, perhaps other information, assembles contact workflow elements that are the best options for process 502 relative to a process beneficiary 508 that will ultimately navigate one or more of the workflow elements as part of navigating the process.

In the case of process 503 assembled for process beneficiary 508, contact workflow engine 504 may create one or more contact workflow elements. For example, it may be that the voice channel is currently busy (all agents busy, high ETW, etc.) at the time of process execution. Therefore, the contact workflow generated for process 502 may not include a voice interaction whereas if agents were currently standing by it might. The session model may be as robust as the functionality of the contact services that may be used to initiate interaction between the process beneficiary working with the process and process resources or fulfillment services.

Process beneficiary 508 may interact with the process through system interface 507. System interface 507 may be a voice interface or a Web interface. A monitor 506 records the process interaction and may obtain any information such as process interaction behavior of process beneficiary 508 while navigating process 503. The process interaction behavior may include process option selection behavior such as voice input or other process option input (touch tone, etc.). For voice input, situations like customer reaction (mood, tone, confusion, etc.) might be considered in creating the best contact workflow elements for the process with current contact center statistics also being considered.

For example, if a customer has selected process branch 2a-4a and at step 4a the customer is audibly frustrated (elevated tone) as determined by monitor 506, then it may trigger a redefinition of contact workflow element 4a. If it is determined that the customer is upset and may require human assistance, but statistics report a very high EWT for a live agent, then it would further aggregate the customer to route the customer to a queue where the customer will be subject to a long wait, possibly leading to call and process abandonment. Contact workflow engine 504 may redefine element 4a "in process" as a "live chat" inbound or outbound request so that at least a live agent may then help the customer immediately (depending on availability). In this way, contact workflow may be dynamically orchestrated "in process" based on the results of process monitoring and current contact center statistics. If it is a voice application, a voice prompt may be given the customer like "currently agents are busy, but we can connect you to a live agent chat now". Say "yes" to request a chat session with an agent.

Contact workflow engine 504 has an output to BP RIE 502 that includes the contact workflow elements 505 that are deemed best for insertion into business process 503 at the time the process will be executed and while the process is running. It is clear that in a given process, there may be process steps that happen in the background and do not involve participation of a process beneficiary and there may be process steps that involve contact workflow where the process beneficiary is actively engaging contact center services. It is at these points in a process primarily where shaping of the customer experience is possible. Therefore it is at a contact workflow portion of a process where information can be obtained directly from a process beneficiary to direct further processing, including managing the business process from that point on, ordering contact workflow (customer treatment) and so on.

Contact workflow points in a process where a process beneficiary is engaging directly with a live agent or automated system are also "jump-off" points in a dynamic process where "soft processes" may be assembled and presented to the process beneficiary as described further above. CWF elements 505 may be default elements when first inserted into business process 503. When BP 503 is in process those CWF points in the process are subject to dynamic management and can be reordered, massaged, and otherwise manipulated in real time based on the needs of the process beneficiary at the time of interaction weighed against contact center statistics. Therefore, process beneficiaries interacting with multiple instances of a same process running in real time may experience different treatments where those treatment variations are executed as part of an overall customer care objective to reduce frustration, confusion, or other forms of dissatisfaction with a particular process.

Session model 501 includes more granular contact workflow not illustrated in this example such as various process options for voice including human to human, and human to system options. Offline processes may be part of a contact workflow element in a process such as fax and email for example. Contact workflow elements inserted in a process may be tied to one another such as a result oriented flow where context related BP elements occur in the process between the interaction steps. For example, CWF element 3b may be a fax initiated by a process beneficiary to a live agent and CWF element 5b may be an outbound telephone call initiated by the agent to the process beneficiary to close the process. Session model 501 in abstract will cover contact workflow capabilities in a contact center; however it may be highly tailored in optional CWF processes and sub-processes depending on the business nature to which it is applied.

It is noted herein that presence information tied to BP resources or to process beneficiaries may also play a role in determining contact workflow for a running process. For example, step 3b may call for an outbound call to be placed to the process beneficiary by default to gather some information before step 4b can occur in the process. If it can be determined at or before step 3b that the process beneficiary will not available by telephone but is "online", contact workflow engine 504 may replace element 3b in the process with an outbound instant message invite instead.

Figure 6:
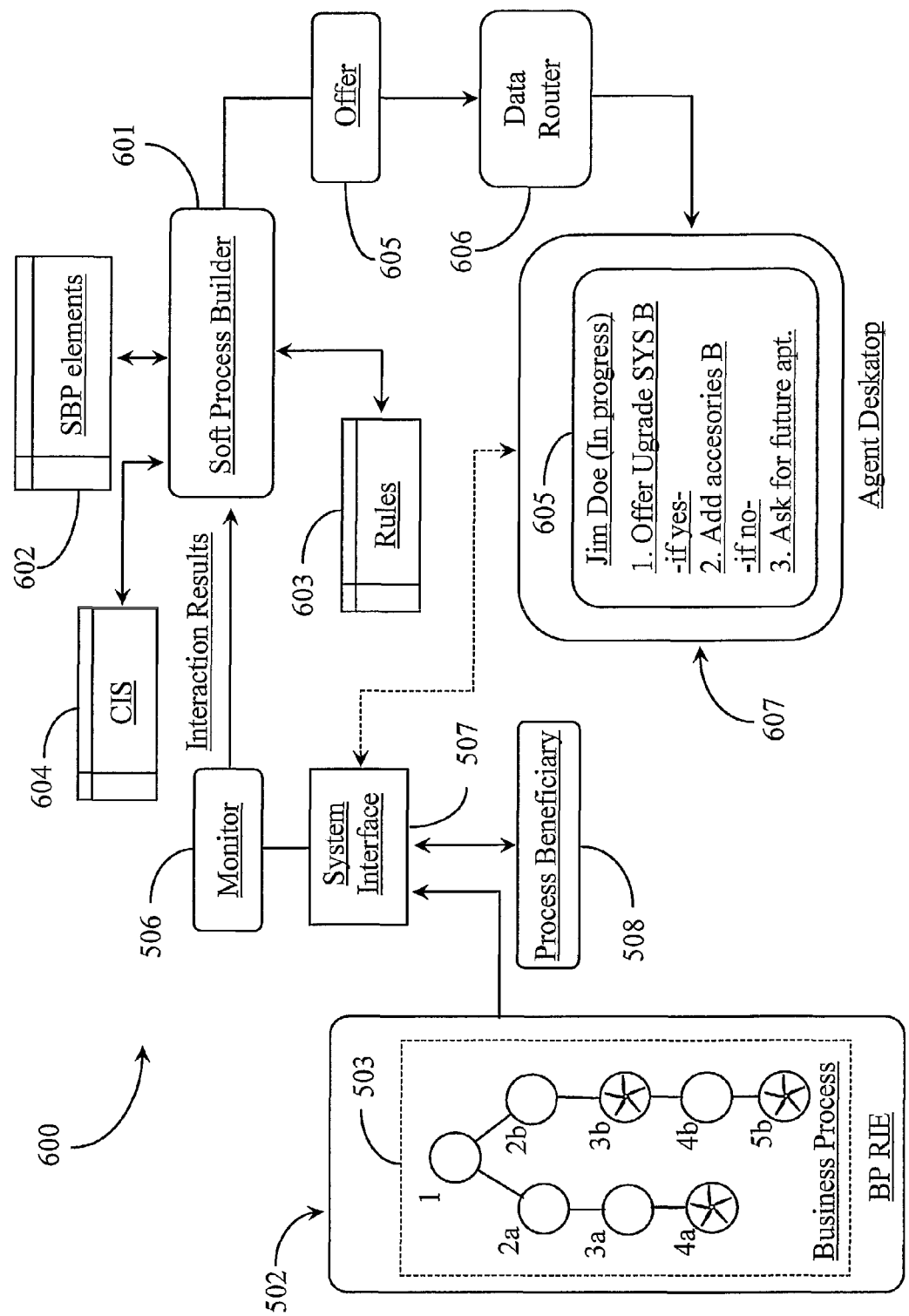
FIG. 6 is a block diagram illustrating assembly and presentation of a soft business process during management of an ongoing business process according to an embodiment of the present invention.

FIG. 6 is a block diagram illustrating assembly and presentation of a soft business process during management of an ongoing business process according to an embodiment of the present invention. A dynamic soft process suggestion system 600 includes a soft process builder 601 that is adapted to assemble a soft business process from soft business process (SBP) elements 602. As described with respect to CWF integration, BP RIE 502 contains a BP 503 for implementation. System interface 507 is monitored by monitor 506 during interaction between process beneficiary 508 and process 503 for interaction results that are fed into the builder 601.

The process for building soft processes may be implemented at a point in an overall business process like process 503 where a contact workflow step occurs and the process beneficiary is engaged with a BP resource like an automated system or a live agent. This should not be construed as limitation as a soft process may be assembled in the background when there is nor direct contact with a process beneficiary based on information already known about the beneficiary.

In one embodiment, process beneficiary engages a CWF element of business process 503 like element 3b for example. During interaction for example monitor 506 records that the process beneficiary is a VIP customer and is engaged in a technical support process with contact workflow element 3b comprising a live call in progress with an agent operating an agent desktop 607. Soft process builder 601 receives notification that process beneficiary 508 is a VIP customer and a check with a customer information system (CIS) 604 may reveal that process beneficiary 508 owns an older version of an entertainment system that may be upgraded to a newer system with more functionality.

Using the information available, process builder 601 may execute a soft process rule 603 that may identify one or more SBP elements 602. Soft process builder 601 may then "assemble" a soft business process that may be formulated as a presentable offer 605 that can be routed to agent desktop 607 by a data router 606 just before, or during the time that the agent has the process beneficiary in session. Offer 605 may display as a window on screen 607. In this case, the presented offer identifies the process beneficiary by name and informs the agent that the session is in progress either current session or in queue for the agent.

Offer 605, in this case, directs or suggests to the agent to offer an upgrade to the process beneficiary to the newer entertainment system B. The offer also directs that if the beneficiary says yes to the upgrade offer; throw in accessories for system B. However, if the process beneficiary says no to the upgrade then ask if a future appointment could be set with the process beneficiary to show the new system. Offer 605 is a "soft offer" or a suggestion to the agent. Process beneficiary 508 will not know anything about the offer unless the agent decides to make the offer, if the agent has the discretionary power of deciding to make the offer or not. It may be that process beneficiary 508, in discussion with the agent operating desktop station 607 is agitated at the moment the offer is presented to the agent and just wants to solve the technical problem at hand with the older system. It may be required that an agent that receives a soft offer make the offer. In one embodiment, a soft offer may be presented as a voice synthesized offer made to a process beneficiary through a voice application.

The nature of process 503 may change depending on a result of the offer made. For example, if process beneficiary 507 accepts the offer to upgrade to system B then a new process may be assembled including all of the required BP elements to conclude the new piece of business. The new process may be tagged onto the end of the "technical support process" that beneficiary 508 is currently engaged in with the agent. The agent can drag and drop the offer into a representation of a process orchestration engine or a "process assembler" on the desktop to trigger execution of a business rule that will handle assembly and execution of the new process. As described before, the new process for upgrading to system B may be assembled somewhat differently for different process beneficiaries.

In one embodiment, a soft process or a hard process can be initiated for a process beneficiary currently engaged in a process the initiation of a new process performed by a live agent interacting with the process beneficiary. Likewise, a soft process or hard process may be automatically initiated for a process beneficiary currently engaged in a process. Soft processes are assembled when information arising from process interaction indicates that the conditions are right for presenting a soft process such as an up-sell opportunity. Soft process results can trigger other processes that are designed to fulfill the goal of the soft process.

Figure 7:
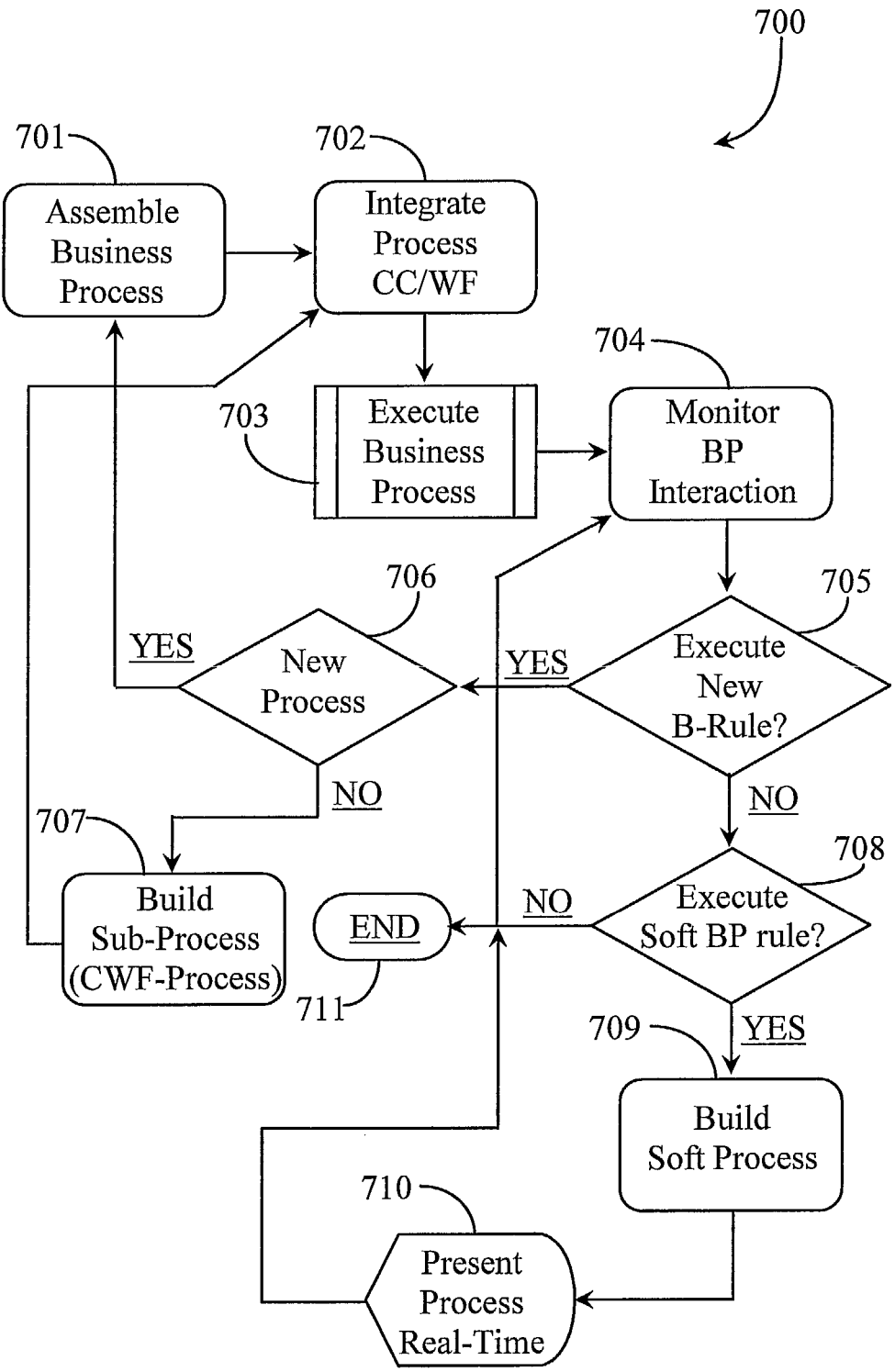
FIG. 7 is a process flow chart illustrating steps for supplementing an assembled and implemented business process with a soft business process according to an embodiment of the present invention.

FIG. 7 is a process flow chart illustrating steps 700 for supplementing an assembled and implemented business process with a soft business process according to an embodiment of the present invention. At step 701, a business process is assembled. Assembly of a business process in this example results from execution of a business process rule that defines business process elements used to assemble the process. The assembled process may vary somewhat from other instances of the basic process based on process beneficiary information known about a process beneficiary and or derived directly from the process beneficiary.

At step 702, the process assembled in step 701 is integrated to contact center workflow according to best fit criteria. In this step, the exact contact workflow processes may be determined according to process beneficiary information and call center statistics received at the time of integration. In this example, the process assembled at step 701 and integrated at step 702 is the best fit process for a particular process beneficiary who has triggered or otherwise initiated the process.

At step 703, the business process is executed on behalf of the process beneficiary. At step 704, the business process interaction is monitored. In this step, monitoring looks for any information that may present itself that may trigger some process modification or may result in assembly of a new process, a sister process, or a portion of a process. Monitoring may be performed on an ongoing basis as the process ensues. At step 705, the system determines based on information acquired if a new business rule will be executed. If the system determines at step 705 that a new BP rule be executed, then at step 706, the system determines, based on the information acquired if a the new business rule creates a new process. If the system determines that a new process is required at step 706, the process moves back to step 701 for assembly of the new business process. The new process may be one that runs in conjunction with the existing process.

If at step 706, the system determines that a new process is not required, then at step 707 the system may build a sub process such as a contact workflow process, for example. If necessary, a sub-process added to an existing process that has one or more default contact workflow elements incorporated may have to be integrated with contact center workflow again at step 702. If a new business process is assembled as a result of a yes at step 706, then the process may be integrated with contact center workflow again at step 702 before being executed at step 703. It is possible that more than one sister process and/or sub processes are assembled on the fly based on beneficiary data and contact center statistics.

If at step 705, the system determines not to execute a new business rule, the system makes a determination if a soft process (SP) business rule (BP) will be executed. If the system determines no at step 708, the existing process may terminate and the business process may end naturally at step 711 with the goal of the business process satisfied without further interference. If at step 708, the system determines that there is sufficient data to warrant execution of a soft BP rule, then at step 709, a soft business process may be created from SBP elements. At step 710, the soft business process assembled at step 709 may be presented in real time to a process beneficiary as an agent script, a graphics display, text in window, an audio alert, or the like. After step 710, the process moves back to step 704 where process monitoring continues.

In this example, executing a soft business process rule may likely occur as a result of some pre-knowledge of the process beneficiary weighed by current process beneficiary interaction data. Process beneficiary interaction data may include direct input from the process beneficiary that triggers rule execution and subsequent assembly of the soft process. Moreover, monitored results of a soft process presentation may launch some other business rule for assembly of another process fulfilling the goal of the soft process.

The system of the present invention may be used to assemble and modify business processes and to dynamically order the direction of a running business process. Dynamic contact workflow can be inserted into the running business process providing yet more flexibility for business process fulfillment in a way that provides an optimum experience for the process beneficiary. Additional business processes or sub-processes including soft business processes can result from active monitoring of a business process.

It will be apparent to one with skill in the art that the business process management system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. An action-response system comprising:
   processor; and
   memory, wherein the memory includes instructions that, when executed by the processor, cause the processor to:
   access information about an initiator of an action, wherein the information is selection of a choice from a set of choices provided to the initiator;
   identify a rule based on the information, wherein the rule identifies a first process to be invoked;
   dynamically assemble a first process element for the first process based on the identified rule;
   monitor execution of the first process;
   output a result of the monitoring;
   identify a second process element based on the result of the monitoring;
   dynamically assemble the second process element into a second process; and
   execute the second process, wherein the second process invokes an action different than an action invoked by the first process alone.

2. The system of claim 1, wherein the instructions that cause the processor to dynamically assemble the first process element also include instructions that cause the processor to:
   identify an assembly order for the first process element; and
   assemble the first process element according to the assembly order.

3. The system of claim 1, wherein the set of choices are provided by an interactive voice response system.

4. The system of claim 1, wherein the second process is executed as a sub-process of the first process.

5. The system of claim 1, wherein the second process is executed concurrently with the first process.

6. The system of claim 1, wherein the second process is executed in lieu of the first process.

7. The system of claim 1, wherein the action invoked by the second process is presentation of one or more prompts to the initiator.

8. The system of claim 1, wherein the action invoked by the second process is establishing interaction between the initiator and a business process resource.

9. The system of claim 8, wherein the business process resource is a contact center agent, and the interaction is a voice call between the initiator and the contact center agent.

10. An action-response method comprising:
    accessing, by a processor, information about an initiator of an action, wherein the information is selection of a choice from a set of choices provided to the initiator;
    identifying, by the processor, a rule based on the information, wherein the rule identifies a first process to be invoked;
    dynamically assembling, by the processor, a first process element for the first process based on the identified rule;
    monitoring, by the processor, execution of the first process;
    outputting, by the processor, a result of the monitoring;
    identifying, by the processor, a second process element based on the result of the monitoring;
    dynamically assembling, by the processor, the second process element into a second process; and
    executing, by the processor, the second process, wherein the second process invokes an action different than an action invoked by the first process alone.

11. The method of claim 10, wherein the dynamically assembling the first process element further includes:
    identifying, by the processor, an assembly order for the first process element; and
    assembling, by the processor, the first process element according to the assembly order.

12. The method of claim 10, wherein the set of choices are provided by an interactive voice response system.

13. The method of claim 10, wherein the second process is executed as a sub-process of the first process.

14. The method of claim 10, wherein the second process is executed concurrently with the first process.

15. The method of claim 10, wherein the second process is executed in lieu of the first process.

16. The method of claim 10, wherein the action invoked by the second process is presentation of one or more prompts to the initiator.

17. The method of claim 10, wherein the action invoked by the second process is establishing interaction between the initiator and a business process resource.

18. The method of claim 10, wherein the business process resource is a contact center agent, and the interaction is a voice call between the initiator and the contact center agent.

\* \* \* \* \*